United States Patent
Sundararajan et al.

(10) Patent No.: US 10,407,018 B2
(45) Date of Patent: Sep. 10, 2019

(54) ROOF MOUNTED AIRBAG

(71) Applicant: Ford Global Technologies, LLC, Dearborn, MI (US)

(72) Inventors: Srinivasan Sundararajan, Ann Arbor, MI (US); Fubang Wu, Woodhaven, MI (US); Robert William McCoy, Ann Arbor, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 95 days.

(21) Appl. No.: 15/729,573

(22) Filed: Oct. 10, 2017

(65) Prior Publication Data
US 2019/0106073 A1   Apr. 11, 2019

(51) Int. Cl.
*B60R 21/232*   (2011.01)
*B60R 21/214*   (2011.01)
*B60R 21/2338*   (2011.01)
*B60R 21/231*   (2011.01)

(52) U.S. Cl.
CPC .......... *B60R 21/232* (2013.01); *B60R 21/214* (2013.01); *B60R 21/231* (2013.01); *B60R 21/2338* (2013.01); *B60R 2021/23161* (2013.01); *B60R 2021/23192* (2013.01); *B60R 2021/23382* (2013.01)

(58) Field of Classification Search
CPC ........ B60R 21/214; B60R 2021/23192; B60R 21/232; B60R 2021/23161; B60R 21/231
See application file for complete search history.

(56) References Cited

U.S. PATENT DOCUMENTS

| | | | |
|---|---|---|---|
| 6,422,593 B1* | 7/2002 | Ryan | B60R 21/232 |
| | | | 280/730.2 |
| 7,926,840 B1* | 4/2011 | Choi | B60R 21/214 |
| | | | 280/730.1 |
| 8,002,309 B2* | 8/2011 | Kim | B60R 21/214 |
| | | | 280/729 |
| 8,403,358 B2 | 3/2013 | Choi et al. | |
| 8,414,017 B2* | 4/2013 | Lee | B60R 21/231 |
| | | | 280/730.1 |
| 8,573,634 B2 | 11/2013 | Choi et al. | |
| 9,340,126 B2 | 5/2016 | Cuddihy et al. | |
| 9,446,733 B2 | 9/2016 | Pausch et al. | |
| 9,580,033 B2 | 2/2017 | Rao et al. | |
| 9,707,921 B2 | 7/2017 | Fischer et al. | |
| 2014/0375033 A1* | 12/2014 | Fukawatase | B60R 21/214 |
| | | | 280/729 |

(Continued)

FOREIGN PATENT DOCUMENTS

DE   4019596 A1   1/1992

*Primary Examiner* — James A English
(74) *Attorney, Agent, or Firm* — Frank A. MacKenzie; Bejin Bieneman PLC (57) ABSTRACT

A system includes a roof and an airbag supported by the roof. The airbag is inflatable away from the roof to an inflated position. The airbag includes an apex adjacent to the roof. The airbag includes a first leg inflatable away from the apex to an end, and a second leg inflatable away from the apex to an end spaced from the end of the first leg. The airbag includes a bottom portion spaced from the apex and inflatable to the inflated position. The bottom portion extends from the end of the first leg to the end of the second leg.

20 Claims, 8 Drawing Sheets

(56) References Cited

U.S. PATENT DOCUMENTS

| | | | |
|---|---|---|---|
| 2015/0203066 A1* | 7/2015 | Pausch | B60R 21/231 280/730.1 |
| 2016/0311393 A1* | 10/2016 | Smith | B60R 21/232 |
| 2017/0129442 A1 | 5/2017 | Choi | |
| 2017/0282838 A1* | 10/2017 | Jung | B60R 21/231 |
| 2019/0054888 A1* | 2/2019 | Fukawatase | B60R 21/232 |

\* cited by examiner

FIG. 7

ROOF MOUNTED AIRBAG

BACKGROUND

A vehicle may include amenities that allow occupants to face one another during operation of the vehicle. As one example, an autonomous vehicle may be autonomously operated, allowing occupants of the vehicle to ride in the vehicle without monitoring the operation of the vehicle. Specifically, the autonomous vehicle may include seats free to rotate during the operation of the vehicle. This may allow the occupants of the seats to face each other and to interact.

During a vehicle impact, occupants may move in a direction influenced by the momentum of the vehicle. In a frontal vehicle impact, an occupant of a rear seat may move towards an occupant of a front seat, and the occupant of the front seat may impact the front seat and rebound rearwardly toward the occupant of the rear seat. This motion may bring the occupant of the rear seat in contact with the occupant of the front seat.

DETAILED DESCRIPTION

A system includes a roof and an airbag supported by the roof. The airbag is inflatable away from the roof to an inflated position. The airbag includes an apex adjacent the roof, a first leg inflatable away from the apex to an end, and a second leg inflatable away from the apex to an end spaced from the end of the first leg. The airbag includes a bottom portion spaced from the apex and inflatable to the inflated position. The bottom portion extends from the end of the first leg to the end of the second leg.

The airbag may include edges spaced from each other along an axis. The edges may extend from the apex to the bottom portion. The edges, in the inflated position, may taper along an axis from the bottom portion to the apex.

The system may include a vehicle body having two sides spaced from each other along the axis. The two sides of the vehicle body may support the roof. The edges of the airbag in the inflated position may abut the sides of the vehicle body.

The first leg, the second leg, and the bottom portion may define an opening therebetween. The opening may extend along the axis from one edge to the other edge of the airbag.

The airbag may define an inflation chamber extending continuously around the opening.

The airbag may define an inflation chamber extending partially around the opening.

The airbag may include a plurality of tethers extending across the opening from the first leg to the second leg. The plurality of tethers may be elongated along the axis from one edge to the other edge.

The airbag may include a plurality of seams. The plurality of seams may extend along each of the first leg, the second leg, and the bottom portion around the opening.

The first leg, the second leg, and the bottom portion may define an opening therebetween. The opening may extend in a cross-vehicle direction. The first leg, the second leg, and the bottom portion may be curved around the opening.

The system may include front seats and rear seats spaced from the front seats. The airbag in the inflated position may be disposed between the front seats and the rear seats.

The first leg and the second leg may extend oblique from each of the roof and the bottom portion.

An airbag assembly may include a base and an airbag supported by the base. The airbag may be inflatable to an inflated position. The airbag may include an apex adjacent the base, a first leg inflatable away from the apex to an end, and a second leg inflatable away from the apex to an end spaced from the end of the first leg. The first leg may be directly connected to the second leg at the apex. The airbag may include a bottom portion spaced from the apex and inflatable to the inflated position. The bottom portion may extend from the end of the first leg to the end of the second leg.

The airbag may include edges spaced from each other along an axis. The edges may extend from the apex to the bottom portion. The edges, in the inflated position, may taper along an axis from the bottom portion to the apex.

The first leg, the second leg, and the bottom portion may define an opening therebetween. The opening may extend along the axis from one edge to the other edge of the airbag. The first leg, the second leg, and the bottom portion may be curved around the opening.

The airbag may define an inflation chamber extending continuously around the opening.

The airbag may define an inflation chamber extending partially around the opening.

The airbag may include a plurality of tethers extending across the opening from the first leg to the second leg. The plurality of tethers may be elongated along the axis from one edge to the other edge.

The airbag may include a plurality of seams. The plurality of seams may extend along each of the first leg, the second leg, and the bottom portion around the opening.

With reference to the Figures, wherein like numerals indicate like parts throughout the several views, a vehicle 10 is generally shown. The vehicle 10 includes front seats 12, rear seats 14 spaced from the front seats 12 in a vehicle fore-and-aft-direction Df, a roof 16, and an airbag 18, 118, 218, 318 supported by the roof 16. During a vehicle impact, the airbag 18, 118, 218, 318 may be inflatable away from the roof 16 from an uninflated position, shown in FIG. 1, to an inflated position, as shown in FIGS. 2, 3B, 4B, 5B, and 6B. A position between the uninflated position and the inflated position is shown in FIGS. 3A, 4A, 5A, and 6A. During the vehicle impact, an occupant may be forced into the airbag 18, 118, 218, 318 in the inflated position. During a frontal impact, the airbag 18, 118, 218, 318 may provide coverage so as to absorb the energy of the lower body and the torso of the occupant. During these types of impacts, the airbag 18, 118, 218, 318 may slow or stop the occupant, e.g., the head of the occupant, from impacting another occupant and/or vehicle components.

Specifically, the airbag 18, 118, 218, 318 includes an apex 20, a first leg 22, a second leg 24, and a bottom portion 26. The apex 20 is adjacent the roof 16. The first leg 22 is inflatable to the inflated position from the apex 20 to an end 28. The second leg 24 is inflatable to the inflated position from the apex 20 to an end 30 spaced from the end 28 of the first leg 22. The bottom portion 26 extends from the end 28 of the first leg 22 to the end 30 of the second leg 24. The bottom portion 26 is spaced from the apex 20 and inflatable to the inflated position. As the airbag 18, 118, 218, 318 inflates from the uninflated position to the inflated position, the first leg 22 and the second leg 24 may extend from the apex 20 away from the roof 16, e.g., towards the rear seat 14 and the front seat 12, respectively. The bottom portion 26 of the airbag 18, 118, 218, 318 may slow or stop the lower body of the occupant of the rear seat 14 from moving off of the rear seat 14, e.g., towards the roof 16. The first leg 22 of the airbag 18 may slow or stop the torso of the occupant of the rear seat 14 from moving off of the rear seat 14 in the vehicle fore-and-aft direction Df. In other words, the first leg 22 of the airbag 18, 118, 218, 318 may slow or stop the occupant of the rear seat 14 from impacting the occupant of the front seat 12 or other vehicle components. By extending between the front seat and the rear seat 14, the airbag 18, 118, 218, 318 absorbs energy from the occupant of the rear seat 14 and may assist in preventing the occupant of the rear seat 14 from impacting the occupant of the front seat 12 or other vehicle components during the frontal impact, which may reduce head injury criteria (HIC). Formulae for HIC is standardized by the National Highway Traffic Safety Administration (NHTSA).

The vehicle 10 may, for example, be any suitable type of automobile. The vehicle 10 may, for example, be an autonomous vehicle. In this situation, the vehicle 10 may allow for the elimination of a steering wheel. For example, the vehicle 10 shown in FIG. 1 does not include the steering wheel. The vehicle 10 may have a computer (not shown) that may control the operations of the vehicle 10 in an autonomous mode, a semi-autonomous mode, and/or a non-autonomous mode. An autonomous mode is defined as one in which each of vehicle propulsion, braking, and steering are controlled by the computer; in a semi-autonomous mode the computer controls one or two of vehicles propulsion, braking, and steering; in a non-autonomous mode, a human operator controls the vehicle propulsion, braking, and steering.

The vehicle 10 may include two sides 32, 34 spaced from each other in a cross-vehicle direction Dc, i.e., transverse to the vehicle fore-and-aft direction Df. The sides 32, 34 of the vehicle 10 may be elongated in the vehicle fore-and-aft direction Df. Each side 32, 34 of the vehicle 10 may be similar or identical to each other.

Figure 1:
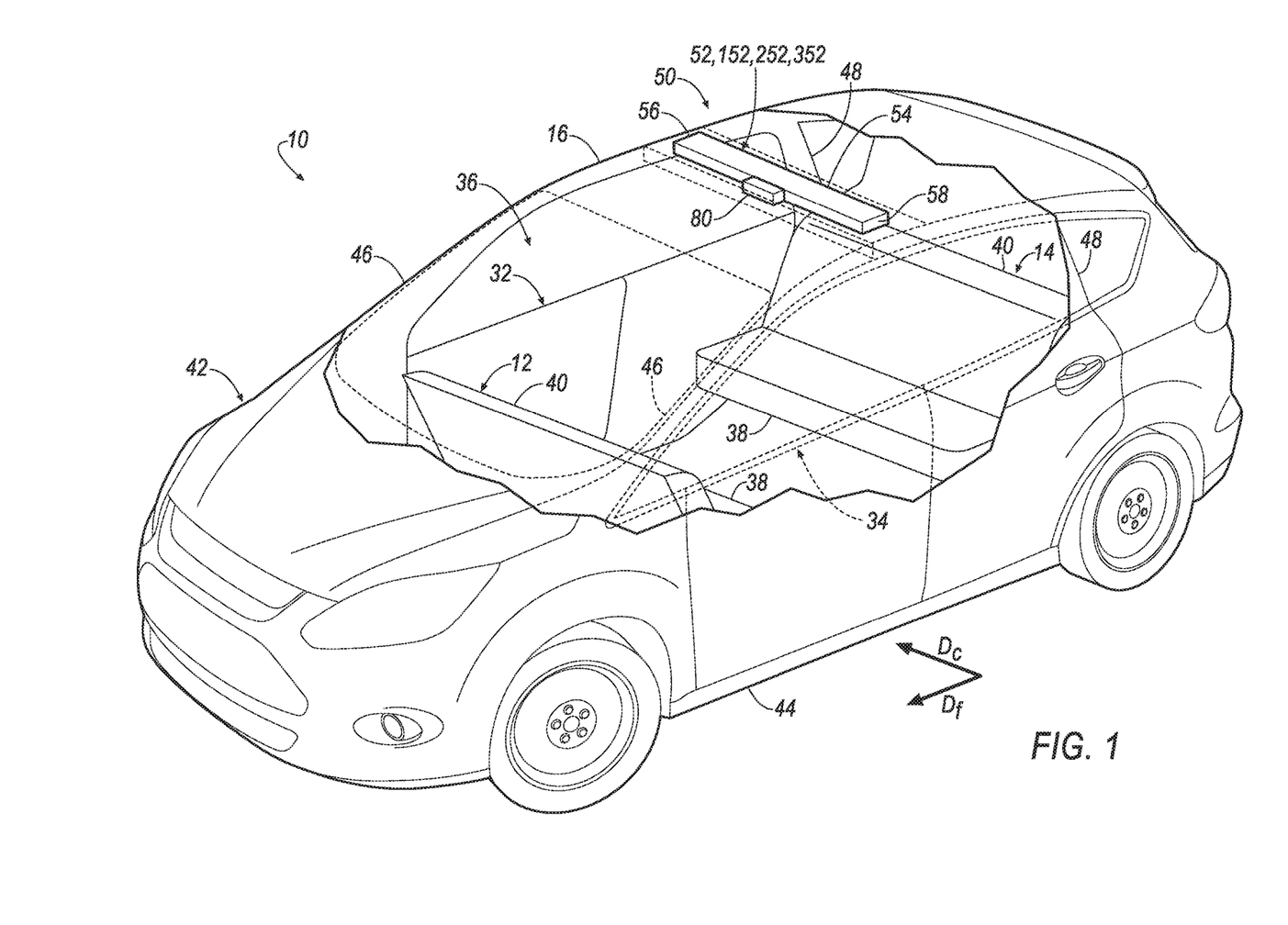
FIG. 1 is a perspective view of a vehicle with an airbag assembly supported by the roof in an uninflated position.

As shown in FIG. 1, the vehicle 10 includes a passenger cabin 36 to house occupants, if any, of the vehicle 10. The passenger cabin 36 includes one or more front seats 12 disposed at a front (not numbered) of the passenger cabin 36 and one or more rear seats 14 spaced from the front seats 12, e.g. in the vehicle fore-and-aft direction Df. The rear seats 14 may be, for example, disposed behind the front seats 12 in the passenger cabin 36. The passenger cabin 36 may also include third-row seats (not shown) at a rear (not numbered) of the passenger cabin 36, in which case the front seats 12 may be second-row seats (not numbered) instead of or in addition to being front seats 12. The front seats 12 and the rear seats 14 may be a same or different type of seat. The front seats 12 and rear seats 14 may be any suitable type of seats. The front seat 12 may be, for example, a bucket seat and the rear seat 14 may be, for example, a bench seat, as shown in FIG. 1.

With continued reference to FIG. 1, the seats, i.e., the front seats 12 and the rear seats 14, may include a seat bottom 38 and a seatback 40. The seatback 40 may be supported by the seat bottom 38 and may extend upwardly from the seat bottom 38. The seatback 40 may be stationary or movable relative to the seat bottom 38. The seatback 40 and/or the seat bottom 38 may be adjustable in multiple degrees of freedom. Specifically, the seatback 40 and/or the seat bottom 38 may themselves be adjustable, in other words, may have adjustable components within themselves, and/or may be adjustable relative to each other.

The vehicle 10 may include a vehicle body 42 having the roof 16, a floor 44 spaced from the roof 16, and a plurality of pillars 46, 48 extending from the roof 16 to the floor 44. For example, the pillars 46, 48 may include an A-pillar 46 and a C-pillar 48 spaced from the A-pillar 46. In this configuration, as shown in the Figures, the vehicle body 42 does not include a B-pillar disposed between the A-pillar 46 and the C-pillar 48. Alternatively, the vehicle body 42 may include the B-pillar between the A-pillar 46 and the C-pillar 48. The roof 16 and the floor 44 may each extend across the passenger cabin 36, i.e., from one side 32 of the vehicle 10 to the other side 34 of the vehicle 10. The roof 16 may be supported by the sides 32, 34 of the vehicle 10, e.g., the roof 16 may be fixed to each side 32, 34 of the vehicle 10.

The roof 16 may support a headliner (not shown) extending from one side 32 of the vehicle 10 to the other side 34 of the vehicle 10. The airbag 18, 118, 218, 318 may be disposed between the roof 16 and the headliner in the uninflated position. The headliner may have a tear seam (not shown) for allowing the airbag 18, 118, 218, 318 to break through the headliner when the airbag 18, 118, 218, 318 is inflated from the uninflated position to the inflated position. The tear seam may be adjacent the airbag 18, 118, 218, 318 in the uninflated position.

The vehicle 10 may include a passenger restraint system 50 including the roof 16 and an airbag assembly 52, 152, 252, 352, which includes the airbag 18, 118, 218, 318. The roof 16 may support the airbag assembly 52, 152, 252, 352, and specifically, may support the airbag 18, 118, 218, 318 when the airbag 18, 118, 218, 318 is in the inflated position. The airbag assembly 52, 152, 252, 352 may be mounted to the roof 16, as set forth below.

The airbag assembly 52, 152, 252, 352 may include a base 54 attached to the roof 16 and supporting the airbag 18, 118, 218, 318. The base 54 may be flat. As another example, the base 54 may include a cavity (not shown) that may house the airbag 18, 118, 218, 318 in the uninflated position and may support the airbag 18, 118, 218, 318 on the roof 16 in the inflated position. In other words, the base 54 may be a housing (not numbered). The base 54 may, for example, include clips, panels, etc. for attaching the airbag 18, 118, 218, 318 and for attaching the airbag assembly 52, 152, 252, 352 to the roof 16.

The base 54 may include two sides 56, 58 spaced from each other in the cross-vehicle direction Dc, e.g., from the one side 32 of the vehicle 10 to the other side 34 of the vehicle 10. The base 54 may be elongated from one side 56 to the other side 58 of the base 54, e.g., in the cross-vehicle direction Dc. For example, one side 56 of the base 54 may be adjacent to one side 32 of the vehicle 10, and the other side 58 of the base 54 may be adjacent to the other side 34 of the vehicle 10, as shown in FIG. 1.

The base 54 may be disposed between the front seats 12 and the rear seats 14. In other words, the airbag 18, 118, 218, 318 may be disposed between the two rows of seats in the inflated position. For example, in the inflated position, the airbag 18, 118, 218, 318 may extend from the base 54 towards each row of seats, i.e., the front seats 12 and the rear seats 14, as set forth further below.

The airbag 18, 118, 218, 318 may be formed of any suitable type of material or materials. The airbag 18, 118, 218, 318 may be formed of any suitable airbag material, for example, a woven polymer. For example, the airbag 18, 118, 218, 318 may be formed of woven nylon yarn, for example, nylon 6-6. Other suitable examples include polyether ether ketone (PEEK), polyetherketoneketone (PEKK), polyester, or any other suitable polymer. The woven polymer may include a coating, such as silicone, neoprene, urethane, and so on. For example, the coating may be polyorgano siloxane.

The airbag 18, 118, 218, 318 may include a plurality of segments, i.e., two or more, that are separately formed and subsequently attached together, e.g., by stitching, welding, adhering, etc. As another example, the airbag 18, 118, 218, 318 may be a single continuous unit, e.g., initially woven as a single piece of fabric. The airbag 18, 118, 218, 318 may have a generally triangular shape.

As set forth further below, several embodiments of the airbag assembly 52, 152, 252, 352 are shown in each of FIGS. 3A-6B. In the embodiment shown in FIGS. 2-3B, the first leg 22, the second leg 24, and the bottom portion 26 of the airbag 18 may be inflatable to the inflated position. In the embodiment shown in FIGS. 4A and 4B, the airbag 118 may include a plurality of seams extending along each of the first leg 22, the second leg 24, and the bottom portion 26. In the embodiment shown in FIGS. 5A-5C, the airbag 218 may include a plurality of tethers extending from the first leg 22 to the second leg 24 and elongated in the cross-vehicle direction Dc. In the embodiment shown in FIGS. 6A and 6B, the first leg 22 of the airbag 318 may be partially inflated to the inflated position. Common numerals are used to identify common features in the embodiments.

Figure 2:
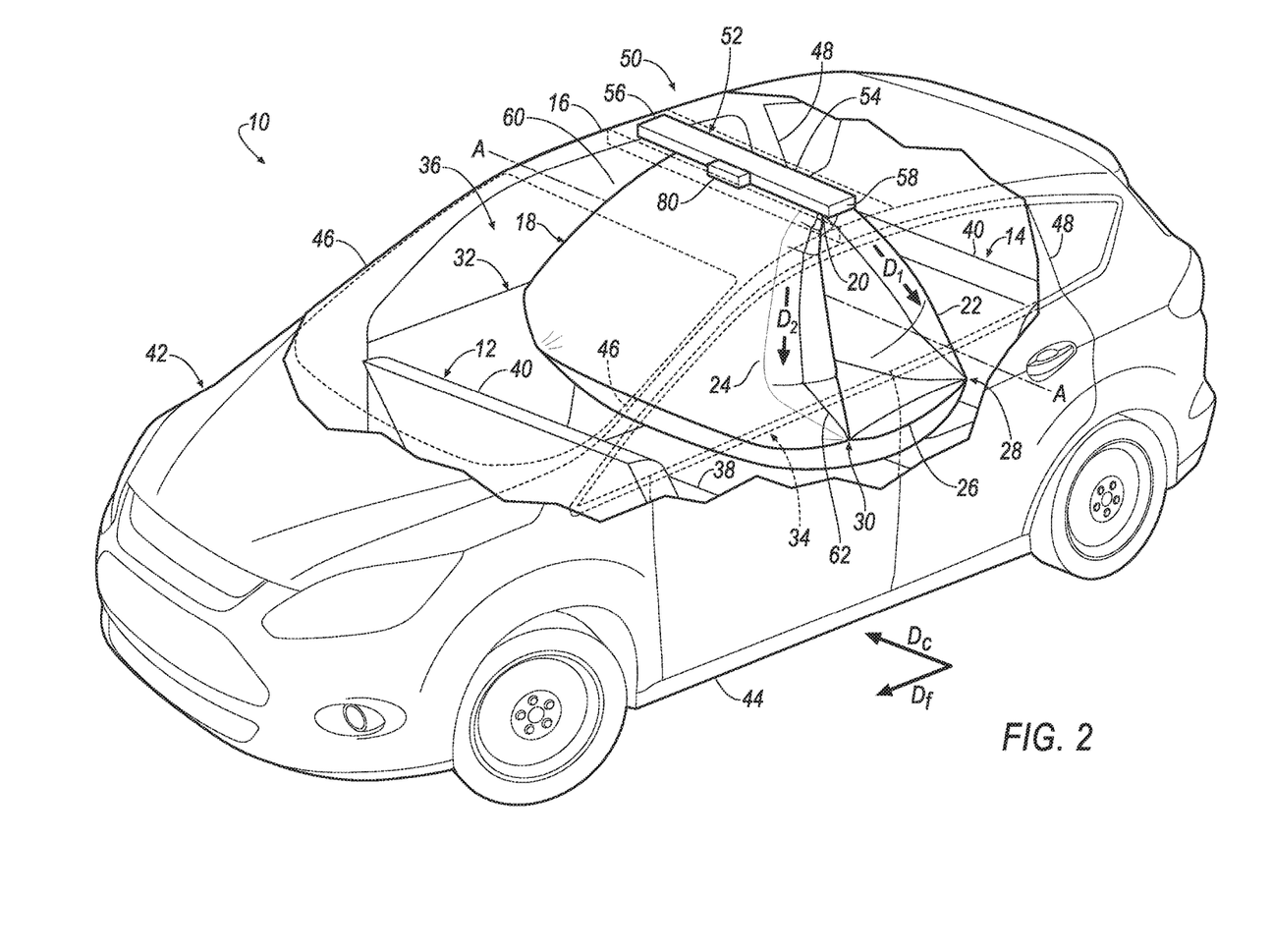
FIG. 2 is a perspective view of the vehicle with the airbag assembly in an inflated position including a first leg and a second leg each extending from the roof to a bottom portion.
Figure 3A:
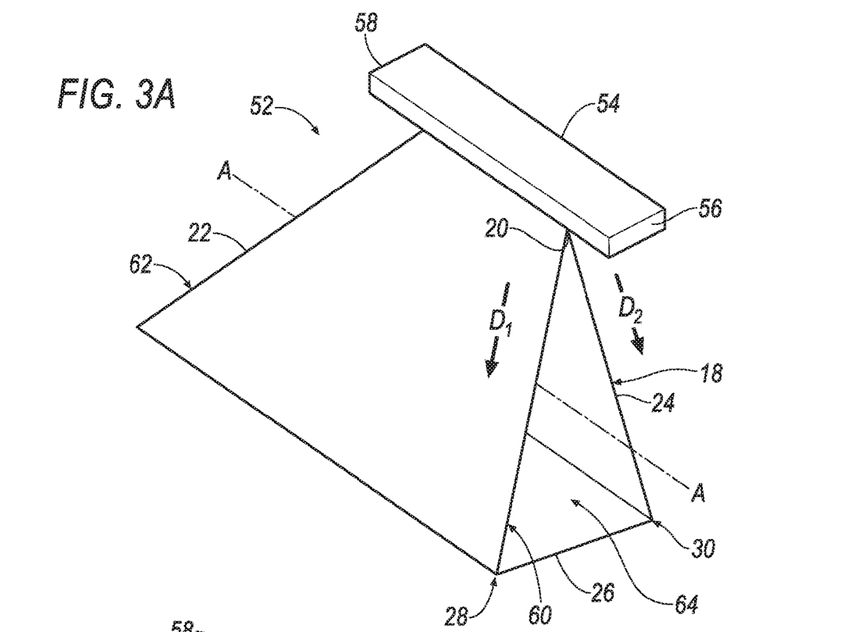
FIG. 3A is a perspective view of one embodiment of the airbag assembly in a position between the uninflated position and the inflated position.
Figure 3B:
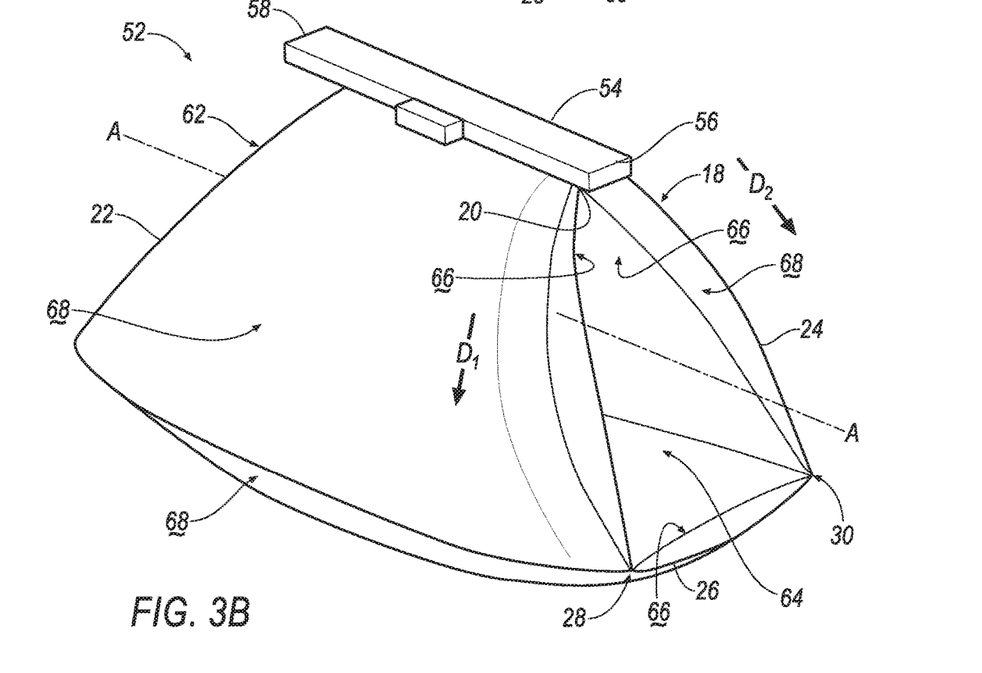
FIG. 3B is a perspective view of the embodiment of the airbag assembly of FIG. 3A in the inflated position.

With reference to FIGS. 2-3B, in the inflated position, the first leg 22 may extend in a first direction D1, e.g., from the roof 16 towards the rear seats 14. The first leg 22 may, for example, extend oblique to each of the roof 16, i.e., the base 54, and the bottom portion 26 of the airbag 18. In other words, the first leg 22 may extend at an angle neither parallel to nor perpendicular to each of the roof 16 and the bottom portion 26. The first leg 22 is elongated in the cross-vehicle direction Dc. The first leg 22 may, for example, face the rear seats 14, e.g., an occupant in the rear seat 14, in the inflated position. The first leg 22 may receive and be impacted by the occupant of the rear seat 14 during the frontal impact. For example, the momentum of the occupant during the frontal impact may force the occupant into the first leg 22 of the airbag 18.

With continued reference to FIGS. 2-3B, the first leg 22 may extend from the apex 20 to the end 28 of the first leg 22. In other words, the end 28 of the first leg 22 may be spaced from the apex 20 in the first direction D1. For example, the end 28 of the first leg 22 may be disposed between the rear seat 14 and the apex 20.

With continued reference to FIGS. 2-3B, in the inflated position, the second leg 24 may extend in a second direction D2 transverse to the first direction D1, e.g., from the roof 16 towards the front seats 12. The second leg 24 may, for example, extend oblique to each of the roof 16, i.e., the base 54, and the bottom portion 26 of the airbag 18. In other words, the second leg 24 may extend at an angle neither parallel to nor perpendicular to each of the roof 16 and the bottom portion 26. The second leg 24 is elongated in the cross-vehicle direction Dc. The second leg 24 may, for example, face the front seats 12, e.g., an occupant in the front seat 12, in the inflated position.

With continued reference to FIGS. 2-3B, the second leg 24 may extend from the apex 20 to the end 30 of the second leg 24. In other words, the end 30 of the second leg 24 may be spaced from the apex 20 in the second direction D2, and may be spaced from the end 28 of the first leg 22 in the vehicle fore-and-aft direction Df. For example, the end 30 of the second leg 24 may be disposed between the front seat 12 and the apex 20.

With reference to FIG. 2, the bottom portion 26 is elongated in the cross-vehicle direction Dc. The bottom portion 26 may be wider than the apex 20 in the cross-vehicle direction Dc. The bottom portion 26 may extend farther in the cross-vehicle direction Dc than the apex 20. The bottom portion 26 may extend in the vehicle fore-and-aft direction Df from the first leg 22 to the second leg 24. For example, the bottom portion 26 may be disposed between and extend towards each row of seats, e.g., the front seats 12 and the rear seats 14. The bottom portion 26 is adjacent the lower body of an occupant in the rear seat 14 in inflated position. In other words, the lower body of an occupant is disposed between the bottom portion 26 of the airbag 18 and the seat bottom 38 of the rear seat 14.

The bottom portion 26 is attached to the first leg 22 and the second leg 24 of the airbag 18. Specifically, the bottom portion 26 may be attached to the end 28 of the first leg 22 and the end 30 of the second leg 24. The bottom portion 26 may be attached to each end 28, 30 in any suitable manner, e.g., stitching, ultrasonic welding, etc. The airbag 18 may be angular or rounded when transitioning from the bottom portion 26 to each of the first leg 22 and the second leg 24.

With reference to FIGS. 3A-3B, the apex 20 may be elongated along the base 54, e.g., in the cross-vehicle direction Dc. The apex 20 may be attached to the base 54, as set forth above. The first leg 22 and the second leg 24 may converge with each other at the apex 20. For example, the first leg 22 may be directly connected, e.g., lacking intermediate components, to the second leg 24 at the apex 20. The first leg 22 may be directly connected to the second leg 24 in any suitable manner, e.g., stitching, ultrasonic welding, etc.

With reference to FIG. 3A, the airbag 18 includes edges 60, 62 spaced from each other along an axis A. The axis A may, for example, extend in the cross-vehicle direction Dc. The edges 60, 62 may extend from the apex 20 to the bottom portion 26 of the airbag 18. For example, each edge 60, 62 may extend along the first leg 22 and along the second leg 24 from the apex 20 to the bottom portion 26.

With reference to FIG. 2, one edge 60 may be adjacent to one side 32 of the vehicle 10 and the other edge 62 may be adjacent to the other side 34 of the vehicle 10. The edges 60, 62 may taper along the axis A, i.e., in the cross-vehicle direction Dc, from the bottom portion 26 to the apex 20. In other words, the bottom portion 26 may be wider than the apex 20 in the cross-vehicle direction Dc, i.e., the bottom portion 26 extends farther along the axis A than the apex 20. For example, the edges 60, 62 along the bottom portion 26 may be spaced from each other in the cross-vehicle direction Dc more than the sides 32, 34 of the vehicle 10. In this situation, the edges 60, 62 of the airbag 18 abut the sides 32, 34 of the vehicle 10 when the airbag 18 is in the inflated position. The edges 60, 62 of the airbag 18 may, for example, abut vehicle components on each side 32, 34 of the vehicle 10, e.g., door trim, windows, etc. Alternatively, when the vehicle body includes the B-pillar, the edges 60, 62 of the airbag 18 may abut the B-pillar on each side 32, 34 of the vehicle 10.

The edges 60, 62 of the airbag 18 may abut the sides 32, 34 of the vehicle 10 such that the sides 32, 34 of the vehicle 10 prevent the airbag 18 from pivoting about the apex 20, i.e., moving in the vehicle fore-and-aft direction Df, when the occupant impacts the airbag 18 during the frontal impact. In other words, in the inflated position, the sides 32, 34 of the vehicle 10 may apply a force (not shown) on the airbag 18 greater than an impact force (not shown) of the occupant impacting the airbag 18, which prevents the airbag 18 from moving during the vehicle impact.

With reference to FIG. 3A, the airbag 18 may define an opening 64. Specifically, the first leg 22, the second leg 24 and the bottom portion 26 may define the opening 64 therebetween. For example, the opening 64 may extend about the axis A to each of the first leg 22, the second leg 24, and the bottom portion 26. The opening 64 may be elongated along the axis A, i.e., in the cross-vehicle direction Dc. The opening 64 may extend from one edge 60 of the airbag 18 to the other edge 62 of the airbag 18. The opening 64 may have a same shape as the airbag 18, e.g., generally triangular.

With reference to FIG. 3A, the airbag 18 may include an inner surface 66 and an outer surface 68 spaced from the inner surface 66. The inner surface 66 and the outer surface 68 may each extend continuously along each of the first leg 22, the second leg 24, and the bottom portion 26 of the airbag 18. The inner surface 66 may face, i.e., define, the opening 64. The outer surface 68 may face away from the opening 64, i.e., face towards the occupants and/or vehicle components.

The airbag 18 may define an inflation chamber (not shown). The inflation chamber is disposed between the inner surface 66 and the outer surface 68. The inflation chamber may, for example, extend continuously around the opening 64. In this situation, the inflation chamber may extend through each of the first leg 22, the second leg 24, and the bottom portion 26. In other words, each of the first leg 22, the second leg 24, and the bottom portion 26 may be in fluid communication with each other. During inflation, the inflation chamber may be inflated from the uninflated position to the inflated position, as set forth below.

Figure 4A:
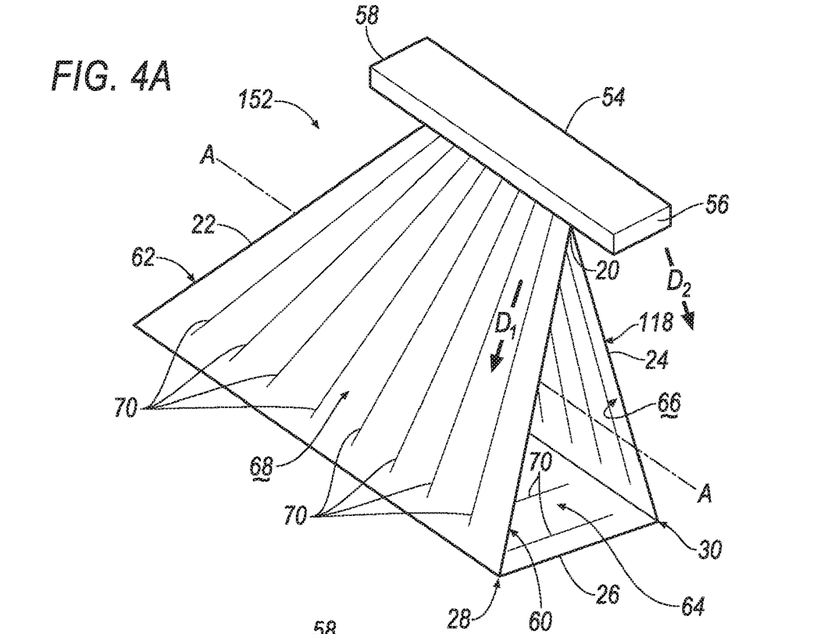
FIG. 4A is a perspective view of another embodiment of the airbag assembly in the position between the uninflated position and the inflated position including a plurality of seams.

With reference to FIG. 4A, the airbag 118 may include a plurality of seams 70. The plurality of seams 70 may extend along each of the first leg 22, the second leg 24, and the bottom portion 26 around the opening 64. For example, the plurality of seams 70 of the first leg 22 may extend along the first leg 22 in the first direction D1. In this situation, the plurality of seams 70 may extend in the first direction D1 between the apex 20 and the end 28 of the first leg 22. As another example, the plurality of seams 70 of the second leg 24 may extend along the second leg 24 in the second direction D2. In this situation, the plurality of seams 70 may extend in the second direction D2 between the apex 20 and the end 30 of the second leg 24. As yet another example, the plurality of seams 70 of the bottom portion 26 may extend along the bottom portion 26 between the end 28 of the first leg 22 and the end 30 of the second leg 24. In other words, the plurality of seams 70 of the bottom portion 26 may extend in the vehicle fore-and-aft direction Df.

The plurality of seams 70 may be spaced from each other in the cross-vehicle direction Dc, i.e., along the axis A. In other words, the plurality of seams 70 may be spaced from each other from one edge 60 of the airbag 118 to the other edge 62 of the airbag 118. The airbag 118 may include any suitable number of seams 70 along each of the first leg 22, the second leg 24, and the bottom portion 26.

Figure 4B:
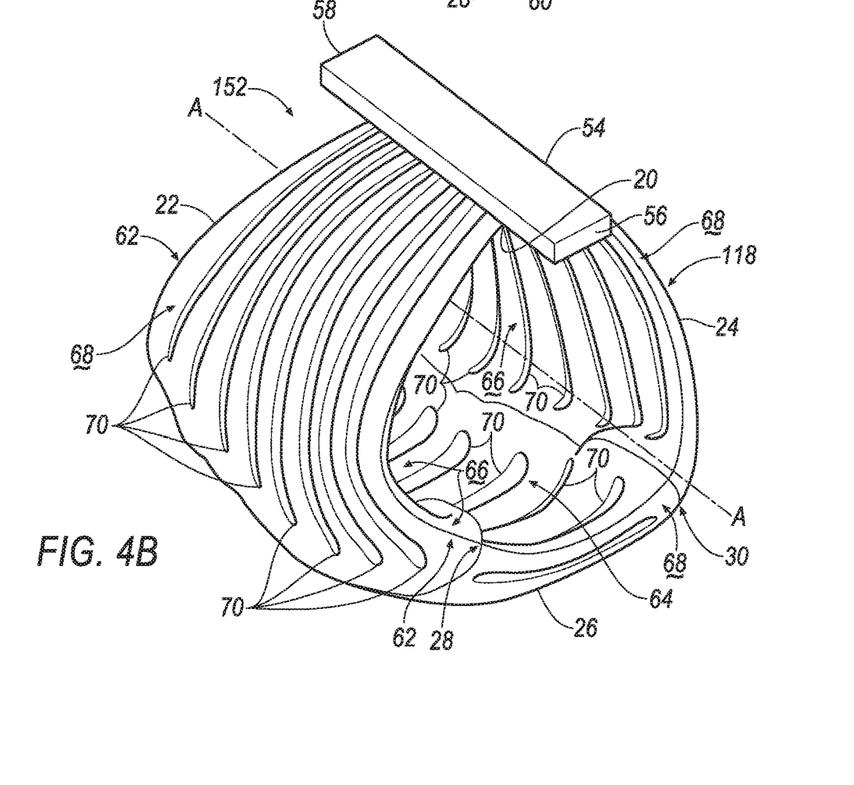
FIG. 4B is a perspective view of the embodiment of the airbag assembly of FIG. 4A in the inflated position.

With reference to FIG. 4B, the plurality of seams 70 may extend from the inner surface 66 to the outer surface 68 of the airbag 118. The plurality of seams 70 may be attached to each of the inner surface 66 and the outer surface 68 of the airbag 118. The plurality of seams 70 may be attached to the inner surface 66 to the outer surface 68 in any suitable manner, e.g., stitching. The plurality of seams 70 allows fluid communication across each seam 70, i.e., in the cross-vehicle direction Dc. In other words, the inflation chamber may extend continuously from one edge 60 of the airbag 118 to the other edge 62 of the airbag 118.

With continued reference to FIG. 4B, the first leg 22, the second leg 24, and the bottom portion 26 may be curved around the opening 64. In other words, the first leg 22, the second leg 24, and the bottom portion 26 may be curved about the axis A. The plurality of seams 70 may, for example, bias the first leg 22, the second leg 24, and the bottom portion 26 to curve about the axis A. For example, the plurality of seams 70 may bias both the inner surface 66 and the outer surface 68 away from the axis A. In other words, the opening 64 may extend more about the axis A, i.e., be larger, when the airbag 118 is in the inflated position as compared to the position, as shown in FIG. 4A. In this situation, the airbag 118 and the opening 64 may each have a generally circular shape.

Figure 5A:
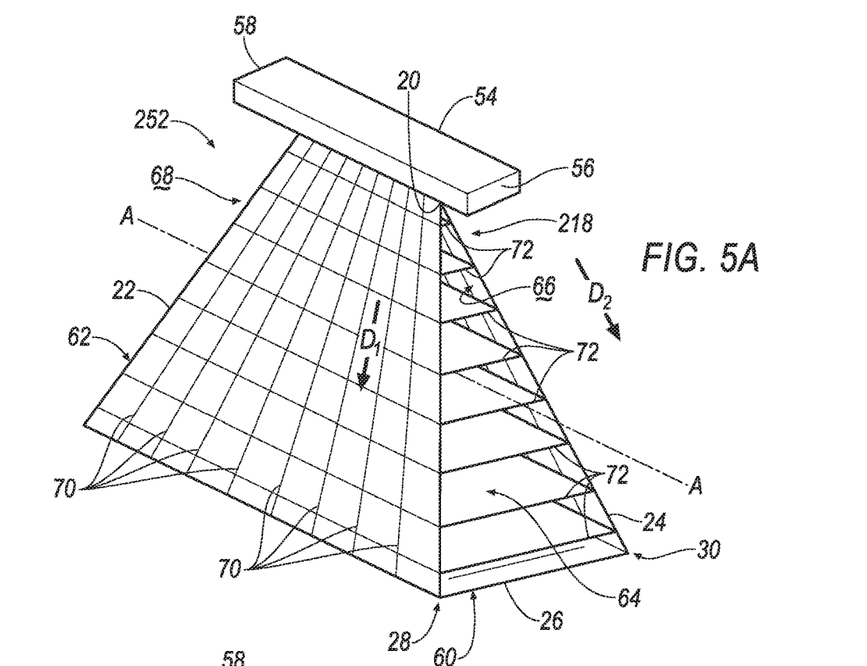
FIG. 5A is a perspective view of another embodiment of the airbag assembly in the position between the uninflated position and the inflated position with a plurality of tethers extending from the first leg to the second leg of the airbag.

With reference to FIG. 5A, the airbag 218 may include a plurality of tethers 72 extending across the opening 64 from the first leg 22 to the second leg 24. In other words, the plurality of tethers 72 may extend along the vehicle fore-and-aft direction Df. The plurality of tethers 72 may be elongated along the axis A from one edge 60 to the other edge 62 of the airbag 218, i.e., in the cross-vehicle direction Dc.

Figure 5B:
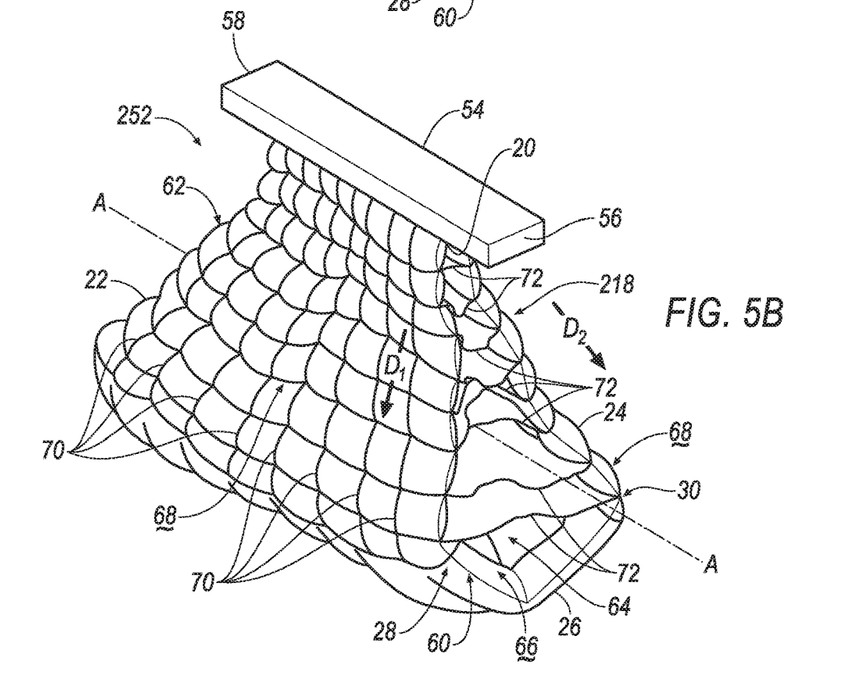
FIG. 5B is a perspective view of the embodiment of the airbag assembly of FIG. 5A in the inflated position with the plurality of tethers extending from an outer surface of the first leg to an outer surface of the second leg.

The plurality of tethers 72 may be attached to each of the first leg 22 and the second leg 24. For example, the plurality of tethers 72 may be attached to the inner surface 66 of the first leg 22 and the inner surface 66 of the second leg 24. Additionally, the inner surface 66 of the first leg 22 may be attached to the outer surface 68 of the first leg 22, and the inner surface 66 of the second leg 24 may be attached to the outer surface 68 of the second leg 24, as shown in FIG. 5B. In other words, the inner surface 66 may be attached to the outer surface 68 along the tethers 72, e.g., from one edge 60 to the other edge 62. In this situation, the inner surface 66 may be attached to the outer surface 68 in a same or different manner as the plurality of seams 70. In other words, each leg 22, 24 may allow fluid communication from the bottom portion 26 to the apex 20, i.e., the inflation chamber extends continuously from the bottom portion 26 to the apex 20.

As another example, the plurality of tethers 72 may be attached to both the inner surface 66 and the outer surface 68 of each of the first leg 22 and the second leg 24. The plurality of tethers 72 may, for example, extend through the inner surface 66 of the airbag 218 to the outer surface 68 of the airbag 218. In this situation, the plurality of tethers 72 may be attached to the inner surface 66 such that the plurality of tethers 72 prevents fluid communication from the inflation chamber to the environment. Additionally, the plurality of tethers 72 may be attached to the outer surface 68 such that the plurality of tethers 72 allows fluid communication across each of the first leg 22 and the second leg 24 of the airbag 218 along the axis A. In other words, the inflation chamber extends continuously from one edge 60 to the other edge 62 along each leg 22, 24 of the airbag 218.

Figure 5C:
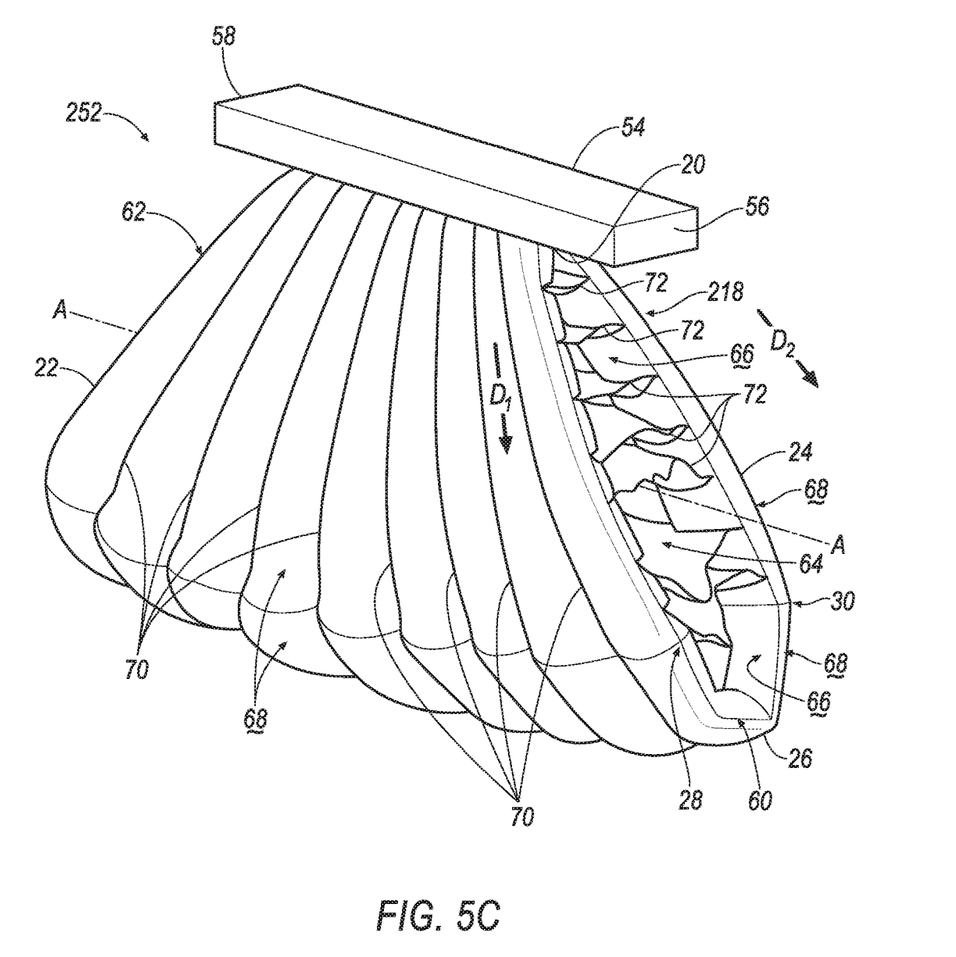
FIG. 5C is a perspective view of the embodiment of the airbag assembly in FIG. 5A in the inflated position with tethers extending from an inner surface of the first leg to an inner surface of the second leg.

As yet another example, the plurality of tethers 72 may extend from the inner surface 66 of the first leg 22 to the inner surface 66 of the second leg 24 of the airbag 218. In this situation, the plurality of tethers 72 are attached to the inner surface 66 of each of the first leg 22 and the second leg 24, as shown in FIG. 5C. The plurality of tethers 72 may be attached to each of the first leg 22 and the second leg 24 of the airbag 218 in any suitable manner, e.g., stitching, ultrasonic welding, etc.

Figure 6A:
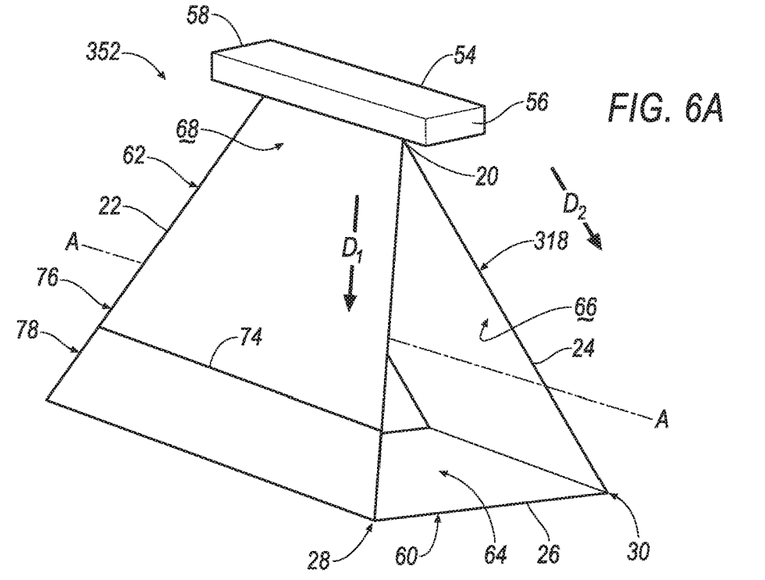
FIG. 6A is a perspective view of another embodiment of the airbag assembly in the position between the uninflated position and the inflated position including a seal extending across the first leg of the airbag.

With reference to FIG. 6A, the inflation chamber may extend partially around the opening 64. For example, the first leg 22 of the airbag 318 may include a seal 74 extending from one edge 60 of the airbag 318 to the other edge 62 of the airbag 318. The seal 74 may be disposed at any suitable location along the first leg 22 between the apex 20 and the end 28 of the first leg 22. In this situation, the first leg 22 may include an upper portion 76 extending from the apex 20 to the seal 74 and a lower portion 78 extending from the seal 74 to the end 28 of the first leg 22. The seal 74 may prevent fluid communication between the upper portion 76 and the lower portion 78 of the first leg 22.

Figure 6B:
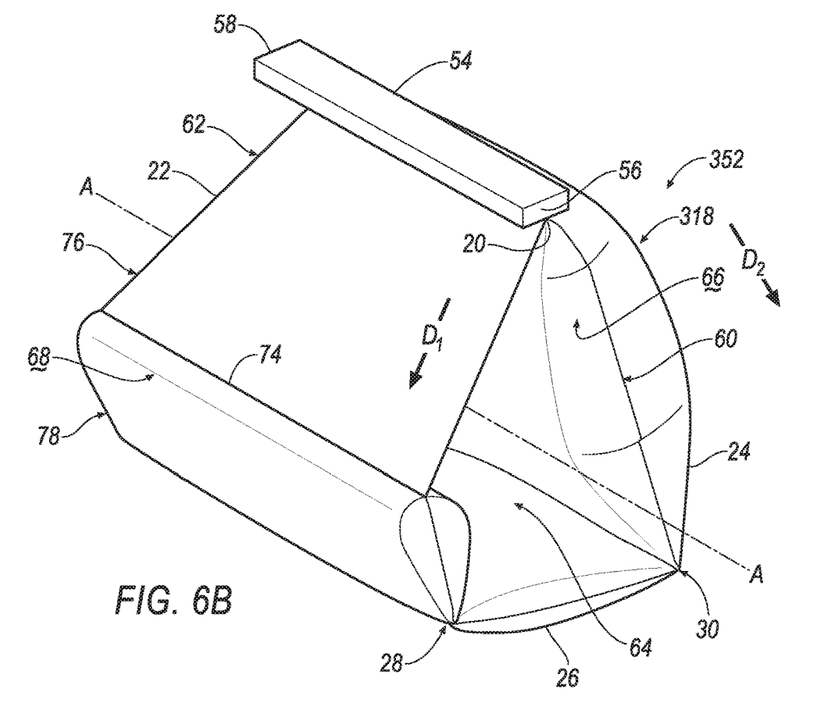
FIG. 6B is a perspective view of the embodiment of the airbag assembly in FIG. 6A in the inflated position.

With reference to FIG. 6B, the first leg 22 may be partially inflated to the inflated position. For example, the lower portion 78 of the first leg 22 may be inflatable to the inflated position. In other words, the inflation chamber may extend from the second leg 24 through the bottom portion 26 to the lower portion 78 of the first leg 22. In this situation, when the upper portion 76 of the first leg 22 is sealed from the inflation chamber, i.e., remains in the position between the uninflated position and the inflated position, the bottom portion 26 may inflate more as compared to when the upper portion 76 of the first leg 22 is inflatable to the inflated position. For example, the bottom portion 26 may inflate more towards each side 32, 34 of the vehicle 10 such that more of the bottom portion 26, i.e., the edges 60, 62, abuts the sides 32, 34 of the vehicle 10 as compared to the previously described embodiments. In this situation, the sides 32, 34 of the vehicle 10 may provide more force on the airbag 318 to prevent the airbag 318 from moving when impacted by the occupant.

The airbag assembly 52, 152, 252, 352 may include an inflator 80 in fluid communication with the airbag 18, 118, 218, 318 that inflates the airbag 18, 118, 218, 318 from the uninflated position to the inflated position. The inflator 80 expands the airbag 18, 118, 218, 318 with an inflation medium, such as a gas, to move the airbag 318 from the uninflated position to the inflated position. Specifically, the inflator 80 may be in communication with the inflation chamber to supply the inflation medium to the inflation chamber. The inflator 80 may be supported by the roof 16, as shown in FIG. 1, or may be disposed in any other suitable location. Alternatively, the inflator 80 may be supported by the base 54.

The inflator 80 may be, for example, a pyrotechnic inflator that uses a chemical reaction to drive the inflation medium into the airbag 18, 118, 218, 318. Alternatively, the inflator 80 may be, for example, a cold-gas inflator that, when activated, ignites a pyrotechnic charge that creates an opening for releasing the pressurized inflation medium to the airbag 18, 118, 218, 318 via a fill tube (not numbered). Alternatively, the inflator 80 may be of any suitable type, for example, a hybrid inflator.

Figure 7:
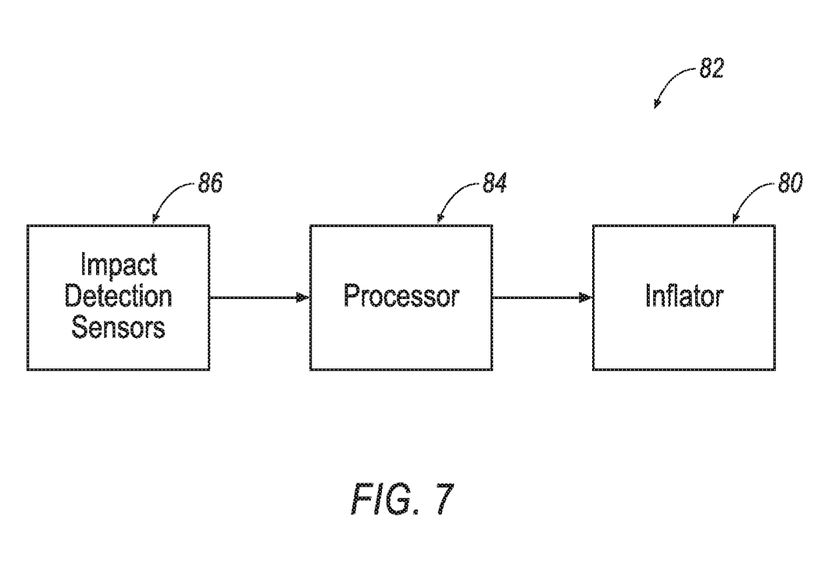
FIG. 7 is a flowchart of an inflation system of the vehicle.

With reference to FIG. 7, the vehicle 10 may include an inflation system 82. The inflation system 82 includes a processor 84 programmed to initiate an inflation of the airbag 18, 118, 218, 318 in response to the vehicle impact. The processor 84 may be embedded in a microcontroller. The microcontroller may include memory, etc. The memory of the microcontroller may store instructions executable by the processor 84 and the processor 84 may read the instructions from the memory and execute the instructions.

The vehicle 10 may include impact detection sensors 86 programmed to detect the vehicle impact to the vehicle 10. The impact detection sensors 86 may be disposed in the roof 16 or elsewhere in the vehicle 10. The impact detection sensors 86 may be of various types, e.g., pressure sensor, acceleration sensor, vision sensor, etc. When the vehicle impact occurs, the processor 84 may receive one or more signals from the impact detection sensors 86 indicating the vehicle impact. In response to receiving the signals from the impact detection sensors 86, the processor 84 may initiate the inflation of the airbag 18, 118, 218, 318. Alternatively, the processor 84 may initiate the inflation of the airbag 18, 118, 218, 318 selectively based on information from the impact detection sensors 86 identifying the physical characteristics of the vehicle impact, e.g., which side 32, 34 of the vehicle 10 impacted, amount of pressure applied to the vehicle 10, etc. and also seat occupancy information, e.g., by using the occupancy sensors disposed inside the seats sensing the occupancy status of the seats.

In order to receive the signals from the impact detection sensors 86 and to initiate the inflation of the airbag 18, 118, 218, 318, the processor 84 communicates with the impact detection sensors 86 and the inflator 80, e.g., through a direct electrical wiring, through which an analog or a digital signal is transmitted, or through a communication network like CAN (Control Area Network), Ethernet, LIN (Local Interconnect Network) or any other way.

In operation, the airbag 18, 118, 218, 318 is in the uninflated position, as shown in FIG. 1, under normal operating conditions of the vehicle 10. When the impact detection sensors 86 sense an impact of the vehicle 10, the processor 84 triggers the inflator 80 to inflate the airbag 18, 118, 218, 318 with the inflation medium from the uninflated position to the inflated position. When the inflator 80 inflates the airbag 18, 118, 218, 318 to the inflated position, the inflation medium flows to the inflation chamber increasing the pressure in the inflation chamber. As the pressure is increased in the inflation chamber, the airbag 18, 118, 218, 318 breaks through the tear seam of the headliner, and the first leg 22 and the second leg 24 extend away from the roof 16 in the first direction D1 and the second direction D2, respectively. Additionally, the bottom portion 26 inflates to the inflated position adjacent the seat bottom 38 of the front seat 12 and the seat bottom 38 of the rear seat 14, i.e., the lower body of the occupant. In the inflated position, the first leg 22 may face the occupant of the rear seat 14.

As the occupant moves within the vehicle 10 due to the momentum of the vehicle impact, the occupant may move towards the first leg 22 and the bottom portion 26 of the airbag 18, 118, 218, 318. During inflation, the edges of the airbag 18, 118, 218, 318 may extend farther in the cross-vehicle direction Dc than the sides 32, 34 of the vehicle 10 such that the edges of the airbag 18, 118, 218, 318 abut the sides 32, 34 of the vehicle 10. When the occupant impacts the airbag 18, 118, 218, 318, the sides 32, 34 of the vehicle 10 may compress the edges 60, 62 of the airbag 18, 118, 218, 318 to prevent movement of the airbag 18, 118, 218, 318 in the vehicle fore-and-aft direction Df. When the occupant impacts the airbag 18, 118, 218, 318, the lower body of the occupant may impact the bottom portion 26 such that the bottom portion 26 assists in retaining the occupant on the rear seat 14. Additionally, the upper body of the occupant may impact the first leg 22 of the airbag 18, 118, 218, 318 such that the first leg 22 of the airbag 18, 118, 218, 318 assists in preventing the occupant from impacting another occupant and/or vehicle components. In other words, the airbag 18, 118, 218, 318 may absorb energy from the occupant to retain the occupant on the rear seat 14, which may assist in reducing impact injuries to the occupant of the rear seat 14.

The disclosure has been described in an illustrative manner, and it is to be understood that the terminology which has been used is intended to be in the nature of words of description rather than of limitation. Many modifications and variations of the present disclosure are possible in light of the above teachings, and the disclosure may be practiced otherwise than as specifically described.

What is claimed is:

1. A system comprising:
   a roof;
   an airbag supported by the roof and being inflatable away from the roof to an inflated position, the airbag including an apex adjacent to the roof, a first leg inflatable away from the apex to an end, a second leg inflatable away from the apex to an end spaced from the end of the first leg;
   a bottom portion spaced from the apex and inflatable to the inflated position, the bottom portion extending from the end of the first leg to the end of the second leg; and
   wherein the airbag includes edges spaced from each other in a cross-vehicle direction and extending from the apex to the bottom portion, the edges in the inflated position tapering in the cross-vehicle direction from the bottom portion to the apex.

2. The system of claim 1, further comprising a vehicle body having two sides spaced from each other along the axis, the two sides of the vehicle body supporting the roof, and wherein the edges of the airbag in the inflated position abut the sides of the vehicle body.

3. The system of claim 1, wherein the first leg, the second leg, and the bottom portion define an opening therebetween, the opening extending along the axis from one edge to the other edge of the airbag.

4. The system of claim 3, wherein the airbag defines an inflation chamber extending continuously around the opening.

5. The system of claim 3, wherein the airbag defines an inflation chamber extending partially around the opening.

6. The system of claim 3, further comprising a plurality of tethers extending across the opening from the first leg to the second leg, the plurality of tethers elongated along the axis from one edge to the other edge.

7. The system of claim 3, wherein the airbag includes a plurality of seams, the plurality of seams extending along each of the first leg, the second leg, and the bottom portion around the opening.

8. The system of claim 1, wherein the first leg, the second leg, and the bottom portion define an opening therebetween, the opening extending in a cross-vehicle direction.

9. The system of claim 8, wherein the first leg, the second leg, and the bottom portion are curved around the opening.

10. The system of claim 1, further comprising two rows of seats spaced from each other and facing each other, and wherein the airbag in the inflated position is disposed between the two rows of seats.

11. The system of claim 1, wherein each of the first leg and the second leg extends oblique from each of the roof and the bottom portion.

12. The system of claim 10, wherein the first leg faces one row of seats and the second leg faces the other row of seats.

13. An airbag assembly comprising:
    a base;
    an airbag supported by the base and being inflatable to an inflated position;
    the airbag including an apex adjacent the base, a first leg inflatable away from the apex to an end, a second leg inflatable away from the apex to an end spaced from the end of the first leg, the first leg directly connected to the second leg at the apex;
    a bottom portion spaced from the apex and inflatable to the inflated position, the bottom portion extending from the end of the first leg to the end of the second leg;
    wherein the airbag includes edges spaced from each other along an axis and extending from the apex to the bottom portion, the edges tapering along the axis from the bottom portion to the apex in the inflated position;
    wherein the first leg, the second leg, and the bottom portion define an opening therebetween, the opening extending along the axis from one edge to the other edge of the airbag; and
    wherein the airbag includes a plurality of seams, the plurality of seams extending along each of the first leg, the second leg, and the bottom portion around the opening.

14. The airbag assembly of claim 13, wherein the first leg, the second leg, and the bottom portion are curved around the opening.

15. The airbag assembly of claim 13, wherein the airbag defines an inflation chamber extending continuously around the opening.

16. The airbag assembly of claim 13, wherein the airbag defines an inflation chamber extending partially around the opening.

17. The airbag assembly of claim 13, further comprising a plurality of tethers extending across the opening from the first leg to the second leg, the plurality of tethers elongated along the axis from one edge to the other edge.

18. An airbag assembly comprising:
    a base;
    an airbag supported by the base and being inflatable to an inflated position;
    the airbag including an apex adjacent the base, a first leg inflatable away from the apex to an end, a second leg inflatable away from the apex to an end spaced from the end of the first leg, the first leg directly connected to the second leg at the apex;
    a bottom portion spaced from the apex and inflatable to the inflated position, the bottom portion extending from the end of the first leg to the end of the second leg;

wherein the airbag includes edges spaced from each other along an axis and extending from the apex to the bottom portion, the edges tapering along the axis from the bottom portion to the apex in the inflated position;

wherein the first leg, the second leg, and the bottom portion define an opening therebetween, the opening extending along the axis from one edge to the other edge of the airbag; and a plurality of tethers extending across the opening from the first leg to the second leg, the plurality of tethers elongated along the axis from one edge to the other edge.

19. A system comprising:

a roof;

an airbag supported by the roof and being inflatable away from the roof to an inflated position, the airbag including an apex adjacent to the roof, a first leg inflatable away from the apex to an end, a second leg inflatable away from the apex to an end spaced from the end of the first leg;

a bottom portion spaced from the apex and inflatable to the inflated position, the bottom portion extending from the end of the first leg to the end of the second leg; and two rows of seats spaced from each other and facing each other, the airbag in the inflated position is disposed between the two rows of seats.

20. The system of claim 19, wherein the first leg faces one row of seats and the second leg faces the other row of seats.

* * * * *